W. L. BEACH.
EXHIBITOR FOR SIGNALS.
APPLICATION FILED MAR. 8, 1920.
1,391,361.
Patented Sept. 20, 1921.
2 SHEETS—SHEET 1.
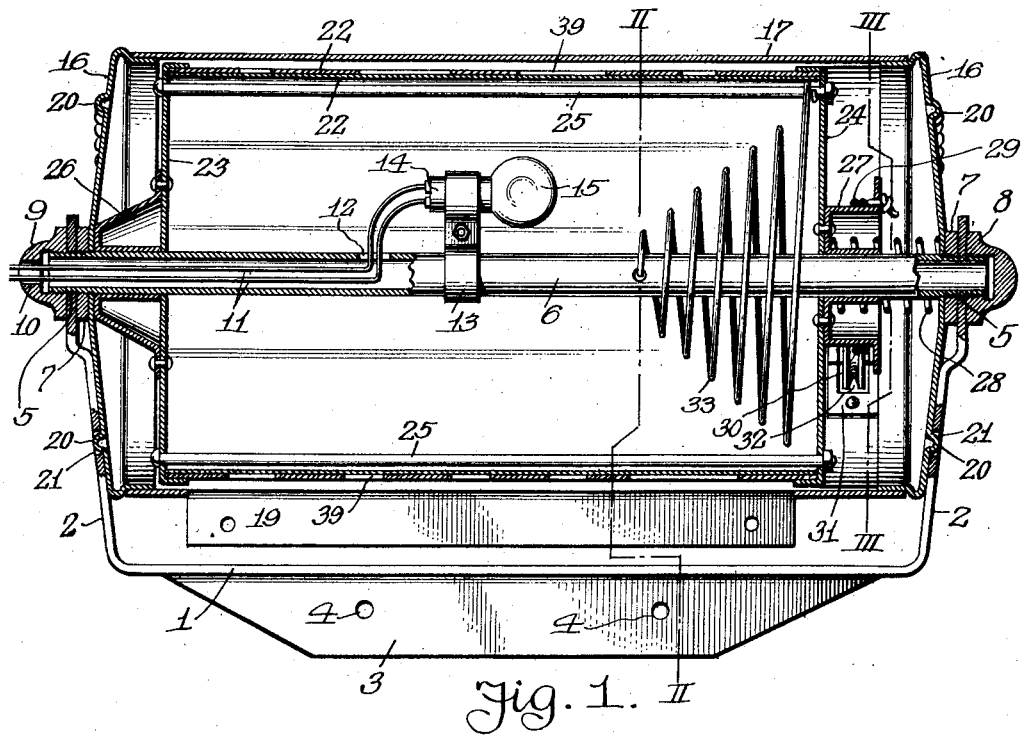
Fig. 1.
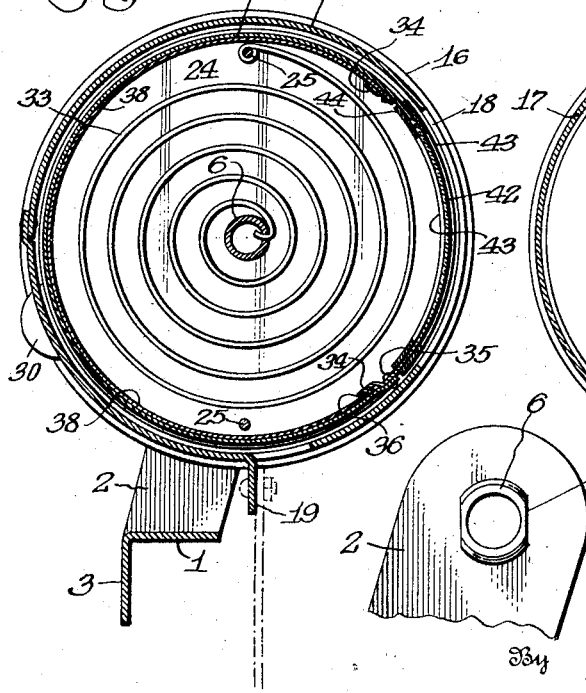
Fig. 2.
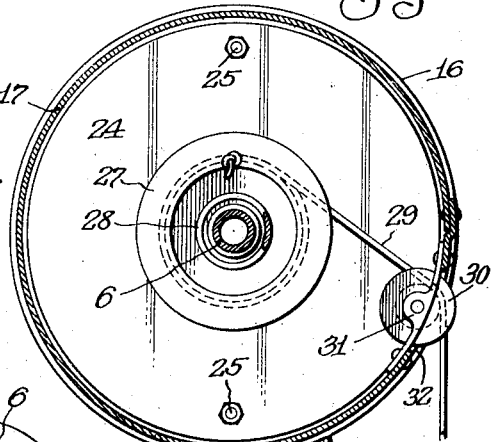
Fig. 3.
Fig. 4.
Walter L. Beach,
Inventor
By
Attorneys

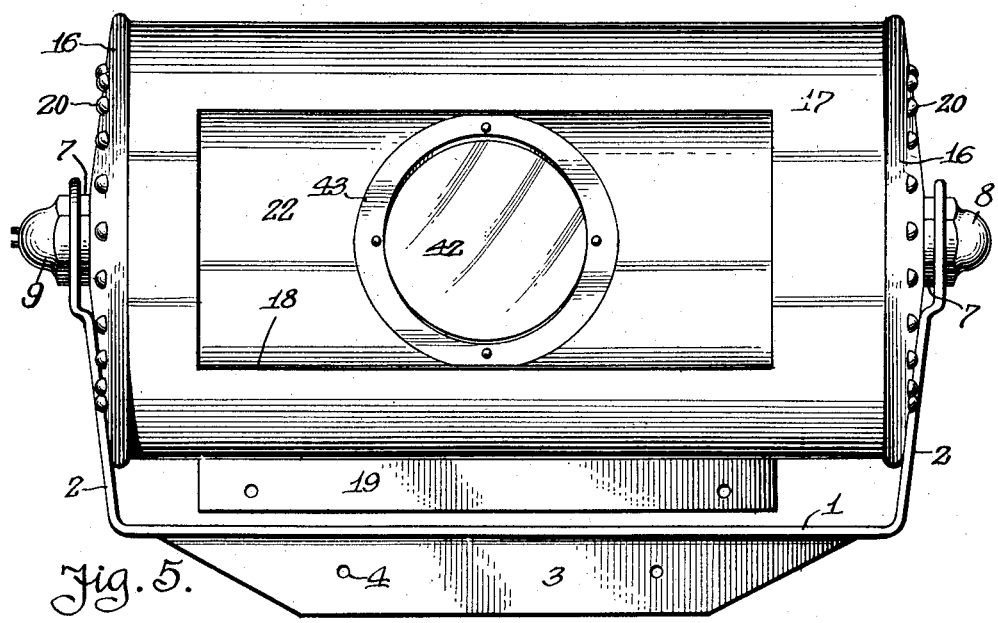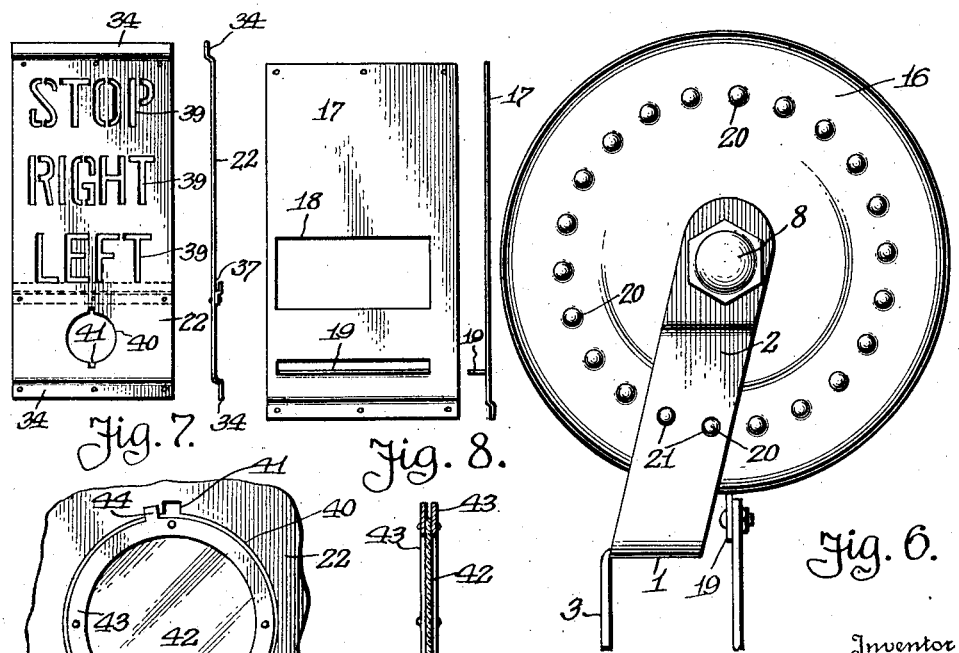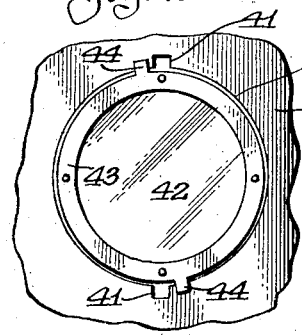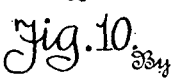

UNITED STATES PATENT OFFICE.

WALTER L. BEACH, OF FLINT, MICHIGAN.

EXHIBITOR FOR SIGNALS.

1,391,361.　　　　　Specification of Letters Patent.　　Patented Sept. 20, 1921.

Application filed March 8, 1920. Serial No. 364,277.

*To all whom it may concern:*

Be it known that I, WALTER L. BEACH, a citizen of the United States of America, residing at Flint, in the county of Genesee and State of Michigan, have invented certain new and useful Improvements in Exhibitors for Signals, of which the following is a specification, reference being had therein to the accompanying drawings.

The primary object of this invention is to provide a novel signal exhibitor that may be advantageously used in connection with automobiles and other motor driven vehicles for indicating to a following vehicle that the signal carrying vehicle is about to stop or turn into another lane of travel, and thus prevent or reduce to a minimum accidents incurred by rear end collisions or injury to automobiles or pedestrians by a misunderstanding as to the movement of an automobile.

Another object of my invention is to provide a signal exhibitor including a novel bracket which may be adjusted relative to the exhibitor casing and attached to an automobile so that sight opening will be in a desired position. Such a bracket will permit of the exhibitor being attached to an automobile at places ordinarily inacessible or prohibitory to other signals.

A further object of my invention is to provide an electrically illuminated signal exhibitor including a rotary sign carrying member adapted to be partially rotated by a flexible member extending into the exhibitor casing, and the flexible member may be operated from any part of the automobile, but more particularly through the medium of a controlling device forming the subject matter of a companion application filed under even date.

A still further object of my invention is to provide a signal exhibitor wherein the parts are constructed with a view of reducing the cost of manufacture and at the same time retain those features by which safety, durability and ease of assembling are secured. With such ends in view, my invention resides in the novel construction to be hereinafter considered and then claimed, and reference will now be had to the drawings, wherein—

Figure 1 is a longitudinal sectional view of an exhibitor in accordance with this invention;

Fig. 2 is a cross sectional view taken on the line II—II of Fig. 1;

Fig. 3 is a similar view taken on the line III—III of Fig. 1;

Fig. 4 is a detail view of a portion of the exhibitor bracket, illustrating a modified form of construction;

Fig. 5 is a rear elevation of the signal exhibitor;

Fig. 6 is an end view of the same;

Fig. 7 is a plan of the sign member in a developed position, this view also showing an edge of the sign member;

Fig. 8 shows plan and edge views of a piece of material for the exhibitor casing;

Fig. 9 is an enlarged elevation of a portion of the sign member showing a tail light lens, and Fig. 10 is a cross sectional view of the same.

In describing my invention by aid of the views above referred to, I desire to point out that the same are intended as merely illustrative of an example by which my invention may be put into practice, therefore I do not care to confine my invention to the precise construction and arrangement of parts other than defined by the appended claims.

In the drawings, the reference numeral 1 denotes a bracket having end arms 2 and a longitudinal flange 3, said flange being apertured, as at 4, so that it may be secured to a suitable support. The flange 3 is formed so that it may be bent to a desired angle relative to the bracket 1 and thus permit of said bracket being attached to a wheel fender, a tire carrier, a spring or some other support about an automobile or similar vehicle.

The end arms 2 are apertured, as at 5, so as to receive the interiorly screw threaded ends of a tubular shaft 6, and screwed on the ends of the shaft 6 are spacing nuts 7 and caps 8 and 9, the latter having an opening 10, so that lead-in wires 11 may extend into the tubular shaft 6 and through an opening 12 in said shaft. Adjacent the shaft opening 12 is a conventional form of bracket 13 for the socket 14 of an incandescent lamp 15 and said incandescent lamp when in circuit with a suitable source of electrical energy is adapted to illuminate the interior of the exhibitor.

Loose on the tubular shaft 6 are casing caps 16 fitted in the ends of a cylindrical casing 17 which has an oblong sight opening 18 and stamped out flange 19 to which may be connected a license sign or card and the casing is preferably made of sheet metal adapted to be bent to cylindrical form with its ends riveted or otherwise connected together, and the flange 19 is in proximity to the sight opening 18 so that rays of light emitted from the casing 17 may illuminate the license card or sign attached to the flange 19.

The casing caps 16 are each formed with a plurality of circumferentially pressed out teeth 20 and these teeth are adapted to engage in openings 21 in the end bracket arms 2 and hold the exhibitor casing in an adjusted position relative to the bracket, so that the sight opening 18 of the casing may cast rays of light in a desired direction.

In the exhibitor casing is a cylindrical hollow sign member 22 provided with end walls 23 and 24 connected by tie rods 25. The wall 23 has a conical member 26 bearing against the casing cap 16 at one end of the bracket 1, said conical member spacing the end of the sign member relative to the end of the exhibitor casing. The end wall 24 has a drum 27 and interposed between said drum and the other casing cap 16 is a coiled compression spring 28, the expansive force of which coöperates with the conical member 26 in preventing longitudinal movement of the sign member within the exhibitor casing.

Attached to and wound on the drum 27 is a flexible member 29 extending over a sheave 30 rotatable in a bracket 31 connected to the exhibitor casing 17 at an opening 32 of said casing, and the flexible member 29 is adapted to be pulled upon to rotate the sign member relative to its supporting tubular shaft 6. As pointed out in the beginning the flexible member 29 is adapted to be operated by a controlling device forming the subject matter of a companion application filed under even date.

To restore the sign member to normal position, after having been partially rotated through the medium of the drum 27 and the flexible member 29, a spiral or coiled retractile spring 33 is employed, said spring having its inner convolution connected to the tubular shaft 6, and its outer convolution connected to one of the tie rods 25 of the sign member.

The sign member 22 is preferably made from a piece of material, as shown in Fig. 7, the piece of material having end flanges 34 adapted to overlap and be connected together, as at 35 so that one of said flanges will provide a socket 36 that may coöperate with a socket 37 of the sign member in holding a piece of transparent material 38, as celluloid. Of course the piece of material forming the sign member is bent to cylindrical form and the piece of celluloid is placed against the inner wall of the sign member and snugly held with its ends in the sockets 36 and 37, as best shown in Fig. 2.

The piece of material forming the sign member 22 has portions thereof cut or stamped out to provide characters 39 of such words as "Stop," "Right," and "Left," and with transparent material at these signs it is possible for rays of light from the incandescent lamp 15 to be cast through the sign member for display at the sight opening 18 of the exhibitor casing. The transparent material which lines the sign member excludes dirt and foreign matter from the interior of said sign member and permits of the words being displayed in desired colors.

The sign member 22 has a circular opening 40 provided with opposed notches 41 and the opening 40 is adapted to receive a detachable lens 42 clamped between peripheral retaining rings 43, one of said retaining rings being of a less diameter than the other and provided with opposed lugs 44. It is therefore possible to set the lens 42 in the opening 40 with the lugs 44 passing through the notches 41, and thus partially rotate the lens so that the lugs 44 will be out of alinement with the notches 41 and thereby coöperate with the sign member in retaining the lens 42 in engagement therewith. The lens 42 is preferably made of transparent material, as celluloid and is adapted to provide a spot or tail light.

As shown in Fig. 1 the ends of the tubular shaft 6 are held by the nuts 7 and the caps 8 frictionally engaging the end arms of the bracket 1, so that the tubular shaft 6 cannot rotate, but as shown in Fig. 4, the ends of the tubular shaft 6 may have opposed facets 45 to engage the walls of an irregularly shaped opening in one of the bracket arms 2 and thus prevent rotation of the tubular shaft relative to the bracket arm.

I attach considerable importance to the fact that the exhibitor parts are cut and stamped of sheet metal and may be finished to harmonize with other pieces of hardware or fixtures about an automobile or similar vehicle.

When it is desired to renew the incandescent lamp 15 within the sign member, the detachable lens 42 may be removed from the opening 40 and the hand inserted to remove the incandescent lamp 15 and replace it with another.

What I claim is:—

1. An exhibitor for signal purposes, comprising a bracket having end arms, a casing, caps on the ends of said casing, circumferentially disposed teeth on said caps adapted to engage in said arms and hold said casing relative to the end arms of said bracket, and a rotary sign member in said casing.

2. An exhibitor as characterized in claim 1, wherein said rotary sign member has one end thereof engaging one of the caps, a coiled expansion spring interposed between said rotary sign member and the other cap to maintain said sign member at one end of said casing, and a drum surrounding a portion of said spring and attached to said sign member for rotating said sign member.

3. An exhibitor comprising a casing, a shaft axially thereof, a rotary sign member on said shaft at one end of said casing, a drum secured to said sign member about said shaft at the opposite end of said casing adapted for rotating said sign member, a coiled spring about said shaft and extending into said drum and abutting an end wall of said casing to retain said sign member at the end of said casing.

4. An exhibitor comprising a bracket having end arms provided with openings, a casing having end caps provided with circumferentially disposed teeth adapted to engage in the openings of the end arms of said bracket and hold said casing in an adjusted position relative to said bracket, and sign displaying means within said casing, and expansion means coöperating with said sign displaying means in retaining said end caps against said bracket arms.

In testimony whereof I affix my signature in the presence of two witnesses.

WALTER L. BEACH.

Witnesses:
KARL H. BUTLER,
ANNA M. DORR.